(No Model.)
F. A. GRÜNEBERG.
BALL BEARING.
No. 477,113. Patented June 14, 1892.
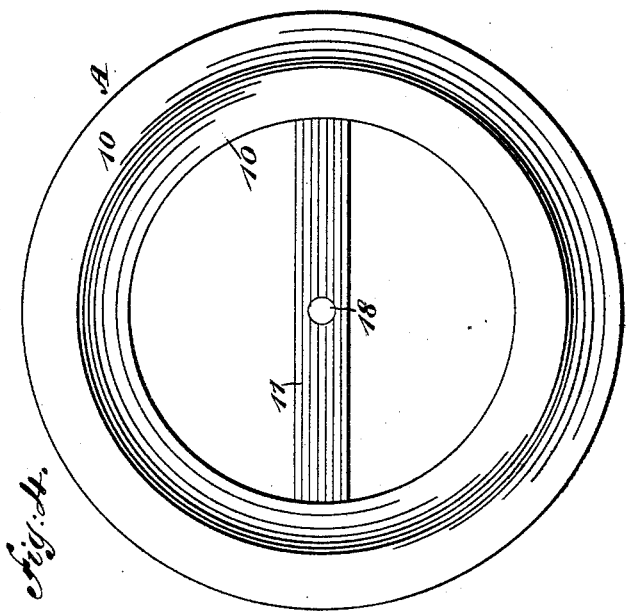
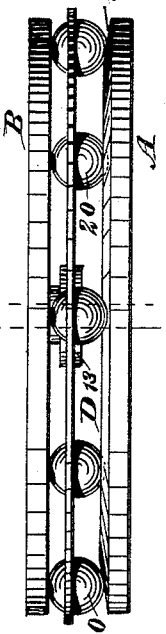
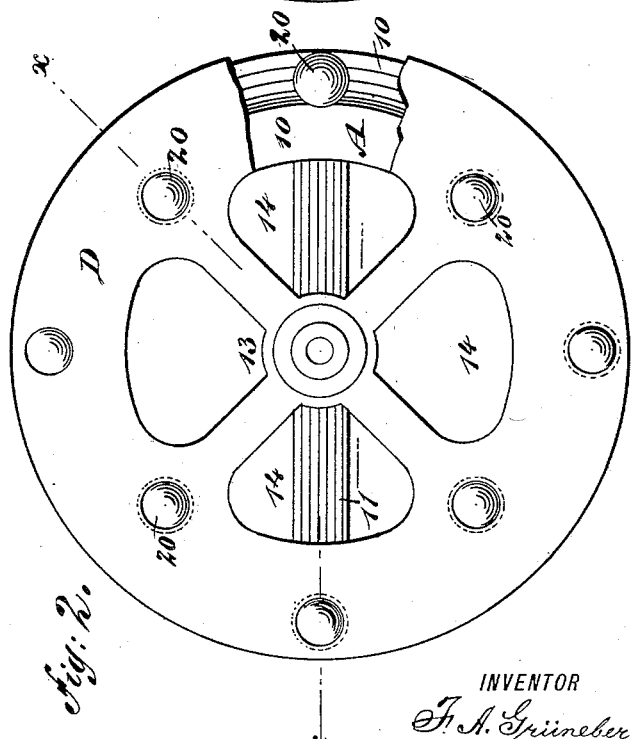
WITNESSES:
Chas Nida
C Sedgwick
INVENTOR
F. A. Grüneberg
BY
Munn & Co
ATTORNEYS.

UNITED STATES PATENT OFFICE.

FRIEDRICH A. GRÜNEBERG, OF NEW YORK, N. Y.

BALL-BEARING.

SPECIFICATION forming part of Letters Patent No. 477,113, dated June 14, 1892.

Application filed August 19, 1891. Serial No. 403,096. (No model.)

*To all whom it may concern:*

Be it known that I, FRIEDRICH AUGUST GRÜNEBERG, of New York city, in the county and State of New York, have invented a new and useful Improvement in Ball-Bearings, of which the following is a full, clear, and exact description.

My invention relates to an improvement in ball-bearings, and especially to the application of ball-bearings to the fifth-wheel of vehicles; and the object of the invention is to provide a fifth-wheel of a vehicle with ball or roller bearings in a simple and economic manner, and also to provide a means whereby the attachment may be made to any fifth-wheel in an expeditious and convenient manner.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a side elevation or edge view of a fifth-wheel of a vehicle having the improvement applied thereto. Fig. 2 is a plan view of the fifth-wheel with the top section removed and the pocket-plate supporting the bearings being partly broken away. Fig. 3 is a vertical section taken, practically, on the line $x$ $x$ of Fig. 2; and Fig. 4 is a plan view of the lower section of the fifth-wheel.

The fifth-wheel comprises the usual lower section A and upper section B, to which is added a pocket-plate D, the pocket-plate being adapted to be located between the upper and lower sections. The upper and lower sections A and B may be shaped in the ordinary manner. Preferably, however, the upper face of the lower section of the wheel is beveled from the center in opposite directions, as illustrated at 10 in the drawings. This is done in order that dust and foreign matter will not readily accumulate thereon, and whatever does collect may be readily removed, and if in practice it is found desirable the under face of the upper section of the wheel may be similarly shaped. Both the upper and lower sections A and B are ordinarily made in ring form and are provided with a diametrical brace or rest bar 11, said brace or rest bar being ordinarily integral with the sections.

The pocket-plate D is made as light as possible consistent with strength and is of circular contour, being provided at each side of a central hub 13 usually with openings 14, reducing thereby the amount of metal employed and the weight of the section. The hub is provided with a short collar 15 upon its upper face and with a longer collar 16 upon its under face. The collars may be termed "extensions" of the hub, and the upper and lower collars or extensions register with apertures 17 and 18, produced, respectively, in the brace-plate 11 of the upper and lower sections of the wheel, as is best shown in Fig. 3. As the upper plate rests upon the shorter collar 15, the space between the under side of that section and the upper face of the pocket-plate is much less than the distance intervening the upper face of the lower wheel-section and the under face of the pocket-plate. The pocket-plate has a series of pockets 19 produced therein, and these pockets, while somewhat circularly arranged, are also more or less stepped, comprising, essentially, an outer series and an inner concentric series. Each pocket is adapted to receive a spherical body or ball 20, about one-third of which spherical body extends upward through the several pockets to an engagement with the under face of the upper wheel-section, one series of said balls or bodies traveling upon one inclined face of this lower section and the other series upon the opposite inclined face, as shown in Fig. 3.

The wheel-sections and the pocket-plate are connected and held to operate jointly by means of a king-bolt or the equivalent thereof, the said king-bolt being shown in dotted lines in Fig. 1. It will thus be observed that the pocket-plate not only serves to held the balls or spherical bodies in a predetermined position, but also serves to maintain the balls or bodies in this position even when the upper wheel-section is removed. The balls are free to turn in their pockets, and the improvement may be applied to any fifth-wheel by the introduction of the pocket-plate between its members.

I desire it to be also understood that the application of the pocket-plate and the balls may be made to any object the equivalent of the fifth-wheel that is provided with upper and lower or outer and inner facing members, as the application of the improvement may be made to articles operated vertically as well as horizontally.

Having thus described my invention, I claim as new and desire to secure by Letters Patent—

The combination, with two rings or disks placed one above the other, the lower one being provided near its peripheral surface, upon its inner face, with two inclined surfaces and the inclination of said surfaces being in opposite directions, of a plate interposed between the rings or disks and provided with a series of pockets, spherical bodies loosely fitted in said pockets and having a bearing against the inner faces of the rings or disks, the bearing of the lower ring or disk being inclined, and a pivot-pin connecting the plate and the rings or disks, substantially as shown and described.

FRIEDRICH A. GRÜNEBERG.

Witnesses:
  S. J. ANDERSON,
  GEO. BUCK.